(12) United States Patent
Bertken

(10) Patent No.: US 11,384,913 B2
(45) Date of Patent: Jul. 12, 2022

(54) BROAD VIEW HEADLAMP

(71) Applicant: IDEAPOND LLC, San Diego, CA (US)

(72) Inventor: Dennis Bertken, San Diego, CA (US)

(73) Assignee: IDEAPOND LLC, Carlsbad, CA (US)

(*) Notice: Subject to any disclaimer, the term of this patent is extended or adjusted under 35 U.S.C. 154(b) by 0 days.

(21) Appl. No.: 17/315,292

(22) Filed: May 8, 2021

(65) Prior Publication Data
US 2021/0348734 A1 Nov. 11, 2021

Related U.S. Application Data

(60) Provisional application No. 63/022,487, filed on May 9, 2020.

(51) Int. Cl.
*F21S 41/25* (2018.01)
*F21V 14/02* (2006.01)
*F21S 41/143* (2018.01)
*F21Y 115/10* (2016.01)

(52) U.S. Cl.
CPC ............ *F21S 41/25* (2018.01); *F21S 41/143* (2018.01); *F21V 14/02* (2013.01); *F21Y 2115/10* (2016.08)

(58) Field of Classification Search
None
See application file for complete search history.

(56) References Cited

U.S. PATENT DOCUMENTS

| 6,481,869 | B1 | 11/2002 | Zedel |
| 6,955,444 | B2 | 10/2005 | Gupta |
| 7,121,676 | B1* | 10/2006 | Kutnyak ............... A42B 3/044 362/105 |
| 7,192,165 | B2 | 3/2007 | Zedel |

(Continued)

FOREIGN PATENT DOCUMENTS

WO 2019213716 A1 11/2019

OTHER PUBLICATIONS

Optimal Ventures LLC, OV LED 802100 Broadbeam LED Headlamp, Ultra-Low Profile Durable Elastic Headband, 210° Illumination, 300 Lumens, 20 Bright LED Lights, 3 AAA Battery Powered, 3 Power Settings, Amazon Marketplace (Link: https://www.amazon.com/802100-Broadbeam-Headlamp-Ultra-Low-Illumination/dp/B07GT49F9C/ref=sr_1_19?dchild=1&keywords=headlamp+strap&qid=1608149644&sr=8-19), US.

(Continued)

*Primary Examiner* — Elmito Breval
(74) *Attorney, Agent, or Firm* — Wang Hardoon, P.C.

(57) ABSTRACT

The broad view headlamp includes a plurality of light sources that illuminate an area in front of the headlamp, an area adjacent to each side of the headlamp, and an area below the headlamp. The headlamp includes a number of lighting modes, such that any one of the light sources can be operated individually or in combination with any one or more of the remaining light sources. The headlamp housing has multiple lighting compartments, each having one or more light sources disposed therein. Each compartment includes an optical lens. The various light sources, together with the optical lenses, allow the headlamp to illuminate a view area extending to, at least, the outer boundaries of the far peripheral vision of the human eye, i.e., 110 degrees to (Continued)

the right and left of center. Thus, the total combined view area illuminated by the headlamp is at least 220 degrees.

26 Claims, 5 Drawing Sheets

(56) References Cited

U.S. PATENT DOCUMENTS

| | | | |
|---|---|---|---|
| 7,226,190 | B2 | 6/2007 | Zedel |
| 8,378,587 | B2 | 2/2013 | Zedel |
| D711,028 | S | 8/2014 | Pritchett |
| 9,458,985 | B2 | 10/2016 | Pritchett |
| 9,534,750 | B2 | 1/2017 | Pritchett |
| 10,794,549 | B2 | 10/2020 | Pritchett |
| 10,794,550 | B2 | 10/2020 | Pritchett |
| 2006/0087842 | A1 | 4/2006 | Alessio |
| 2009/0251070 | A1 | 10/2009 | Zedel |
| 2010/0181940 | A1* | 7/2010 | Bucalo .................. H05B 31/50 315/313 |
| 2014/0146552 | A1 | 5/2014 | Hui |
| 2014/0198484 | A1 | 7/2014 | Feustel et al. |
| 2014/0334132 | A1 | 11/2014 | Ferguson |
| 2020/0248896 | A1* | 8/2020 | Gall .......................... F21L 4/04 |

OTHER PUBLICATIONS

Petzl, Petzl Actik Core Headlamp, REI Website (Link: https://www.rei.com/product/163701/petzl-actik-core-headlamp?color=RED), US.
Petzl, Petzl Tactikka Core Headlamp, REI Website (Link: https://www.rei.com/product/163703/petzl-tactikka-core-headlamp), US.
Black Diamond, Black Diamond ReVolt 350 Headlamp, REI Website (Link: https://www.rei.com/product/170741/black-diamond-revolt-350-headlamp?color=AZUL), US.
Coast, Coast FL60R 450 Lumen Rechargeable LED Flashlight, Accessories Included, orange, Amazon Marketplace (Link: https://www.amazon.com/COAST-Rechargeable-Flashlight-Accessories-Included/dp/B07YFBRWW6/ref=sr_1_4?dchild=1&keywords=coast+fl60r&qid=1627928996&s=hi&sr=1-4), US.
Coast, Coast FL78R 530 Lumen Rechargeable Tri-Color LED Headlamp with Twist Focus, Amazon Marketplace (Link: https://www.amazon.com/COAST-FL78R-Rechargeable-Tri-Color-Headlamp/dp/B07W62W1M1/ref=sr_1_4?dchild=1&keywords=coast+fl78r&qid=1627929032&s=hi&sr=1-4), US.
Energizer, Energizer Rechargeable LED Headlamp, Water Resistant & Super Bright, Rugged Headlight for Camping, Running, Outdoors, Emergency Light, (USB Included), Amazon Marketplace (Link: https://www.amazon.com/Energizer-Vision-Ultra-Rechargeable-Headlamp/dp/B07JD4KNKQ/ref=sr_1_4?dchild=1&keywords=energizer+vision+headlamp&qid=1627929076&s=hi&sr=1-4), US.
International Search Report and Written Opinion issued in PCT/US2021/031450, dated Aug. 16, 2021, 11 pages.

* cited by examiner

BROAD VIEW HEADLAMP

CROSS-REFERENCE TO RELATED APPLICATION(S)

This application claims priority to U.S. Provisional Patent Application No. 63/022,487 filed on May 9, 2020, entitled "BROAD VIEW HEADLAMP", the entire disclosure of which is incorporated by reference herein.

BACKGROUND OF THE INVENTION

1. Field of Invention

This invention relates to headlamps with multiple lighting capabilities. More specifically, this invention relates to multi-mode headlamps that provide multiple lighting modes for illuminating different areas of interest.

2. Description of Related Art

Headlamps mount to the head of a user to provide hands-free lighting. Traditional headlamps typically include a spot beam and/or a flood beam to illuminate an area in front of the user. As an example, U.S. Pat. No. 7,226,190 to Petzl discloses a portable lighting lamp comprising an emitting module equipped with at least one light-emitting diode for emitting a light beam, a fixing and connecting element of said diode, and an optical focusing device able to be moved in front of the diode to make the visualization angle of the light beam vary. The optical focusing device is advantageously constituted by one or more Fresnel lenses mounted on a swiveling support or a rotary knob designed to occupy either an inactive position situated outside the light emission field of the diode or an active position wherein said tight beam passes through the lens so as to obtain either broad lighting with a short range or narrow lighting with a long range.

While useful, traditional headlamps do not provide peripheral or downward-disposed lighting, in addition to the forward-directed lighting. Thus, the user is required to move his/her head to re-direct the spot/flood beams to illuminate an area of interest. In an effort to address the peripheral lighting deficiency of traditional headlamps, wide-angle headlamps are designed to provide wide-angle lighting. Wide-angle headlamps include a number of LED lights positioned along a flexible strip or band to deliver wide-angle continuous lighting to provide front-on and peripheral lighting. While wide-angle headlamps are able to illuminate a broader area, they do not provide the capability to deactivate one or more of the lights to produce various lighting effects, such as front-on only or peripheral-only lighting. Further wide-angle headlamps do not utilize reflectors or lenses to provide directed, i.e., focused, lighting. Instead, the strip of LEDs simply casts a broad, non-focused spread of light. Additionally, as with traditional headlamps, wide-angle headlamps do not provide a capability for downward-directed lighting that can be used in addition to forward-directed lighting.

Based on the foregoing, there's a need in the art for a headlamp that provides any desired combination of forward-disposed lighting, far peripheral lighting, and/or downward-disposed lighting to improve the overall visibility capabilities of the user.

SUMMARY OF THE INVENTION

According to an embodiment of the present invention, the headlamp includes a first light source disposed at a front of the headlamp, a second light source disposed at a right side of the headlamp, a third light source disposed at a left side of the headlamp, a fourth light source disposed at a bottom of the headlamp, and a power source in electrical communication with the first light source, the second light source, the third light source, and the fourth light source. The first light source is configured to illuminate an area in front of the headlamp, the second light source is configured to illuminate an area to the right of the headlamp, the third light source is configured to illuminate an area to the left of the headlamp, and the fourth light source is configured to illuminate an area below the headlamp. In an embodiment, a combined view area illuminated by the first light source, the second light source, and the third light source is at least 220 degrees.

In an embodiment, the first light source includes a spot light and one or more flood lights. In an embodiment, the one or more flood lights are disposed adjacent to the spot light. In a further embodiment, the first light source also includes one or more night vision lights.

In an embodiment, any one of the light sources can be activated and operated individually or in combination with any one or more of the remaining light sources.

In an embodiment, the first light source, the second light source, the third light source, and the fourth light source are dimmable.

In an embodiment, each of the first light source, the second light source, the third light source, and the fourth light source are housed within separate compartments of a housing of the headlamp, wherein each compartment is separated from an area exterior to the housing by one or more lenses. The one or more lenses are configured to increase a degree of horizontal and vertical lighting and beam distance output by the first light source, the second light source, the third light source, and the fourth light source.

In an embodiment, the light output of the first light source, the second light source, the third light source, and the fourth light source ranges from 100 lumens to 650 lumens.

In an embodiment, each of the first light source, the second light source, the third light source, and the fourth light source is comprised of at least one LED.

In an embodiment, the power source includes at least one dry cell battery. Additionally, or alternatively, the power source includes at least one rechargeable battery.

According to an embodiment of the present invention, the headlamp includes a first light source disposed at a front of the headlamp, a second light source disposed at a bottom of the headlamp, and a power source in electrical communication with the first light source and the second light source. The first light source is configured to illuminate an area in front of the headlamp and the second light source is configured to illuminate an area below the headlamp. In an embodiment, the first light source and the second light source are housed within separate compartments of a housing of the headlamp, wherein each compartment is separated from an area exterior to the housing by one or more lenses.

According to an embodiment of the present invention, the headlamp includes a housing, a first light source disposed at a front of the headlamp, a second light source disposed at a right side of the headlamp, a third light source disposed at a left side of the headlamp, and a power source in electrical communication with the first light source, the second light source, and the third light source. The first light source is configured to illuminate an area in front of the headlamp, the second light source is configured to illuminate an area to the right of the headlamp, and the third light source is configured to illuminate an area to the left of the headlamp. Each of the first light source, the second light source, and the third light source are housed within separate compartments of the housing, wherein each compartment is separated from an area exterior to the housing by one or more lenses. The combination of the first light source, the second light source, and the third light source, together with the combination of optical lenses, allows the headlamp to illuminate a view area extending to, at least, the outer boundaries of the far peripheral vision of the human eye, i.e., 110 degrees to the right and left of center. As such, the total combined view area illuminated by the headlamp is at least 220 degrees.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
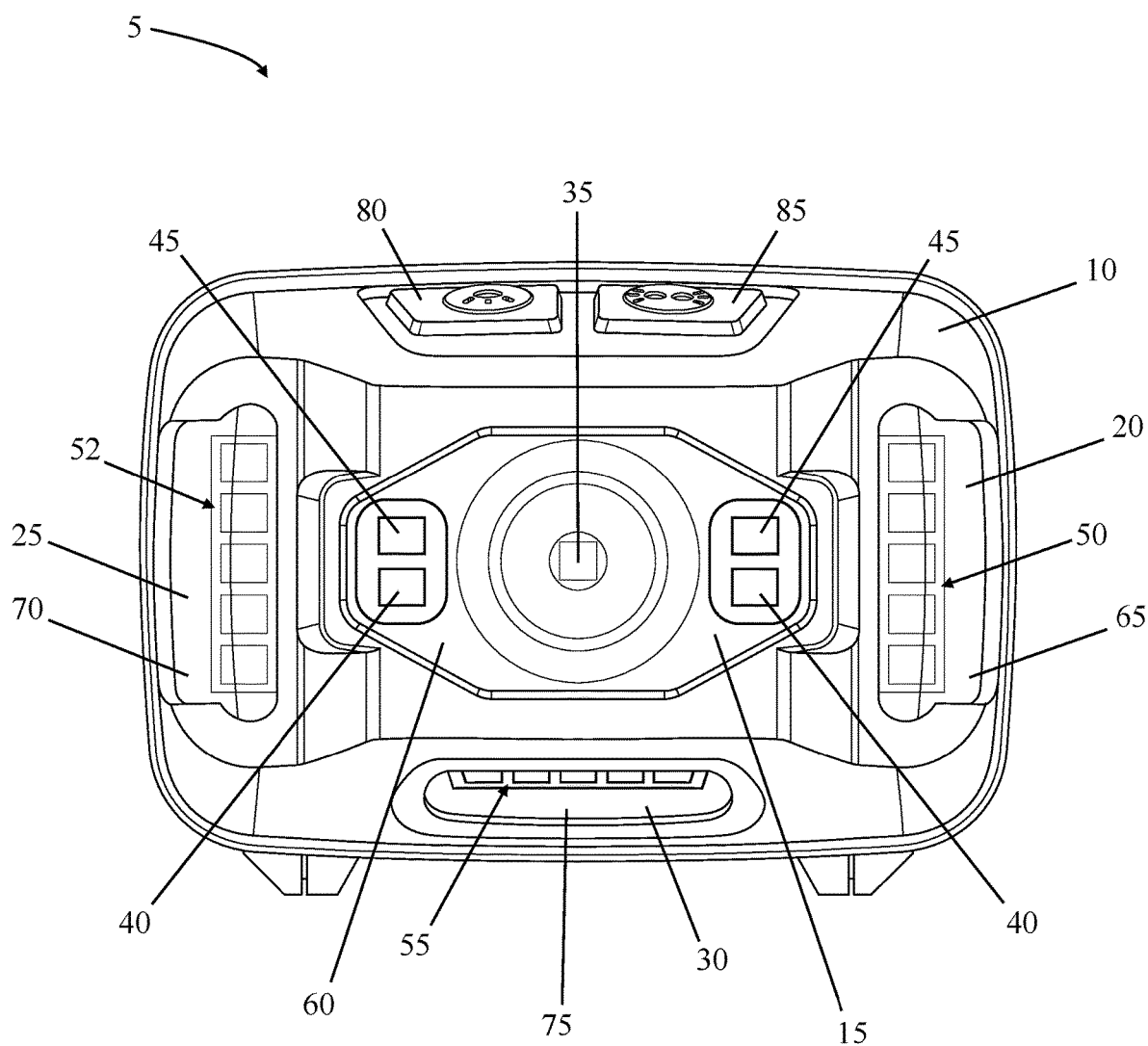
FIG. 1 shows a top-front perspective view of the broad view headlamp, according to an embodiment of the present invention.
Figure 2:
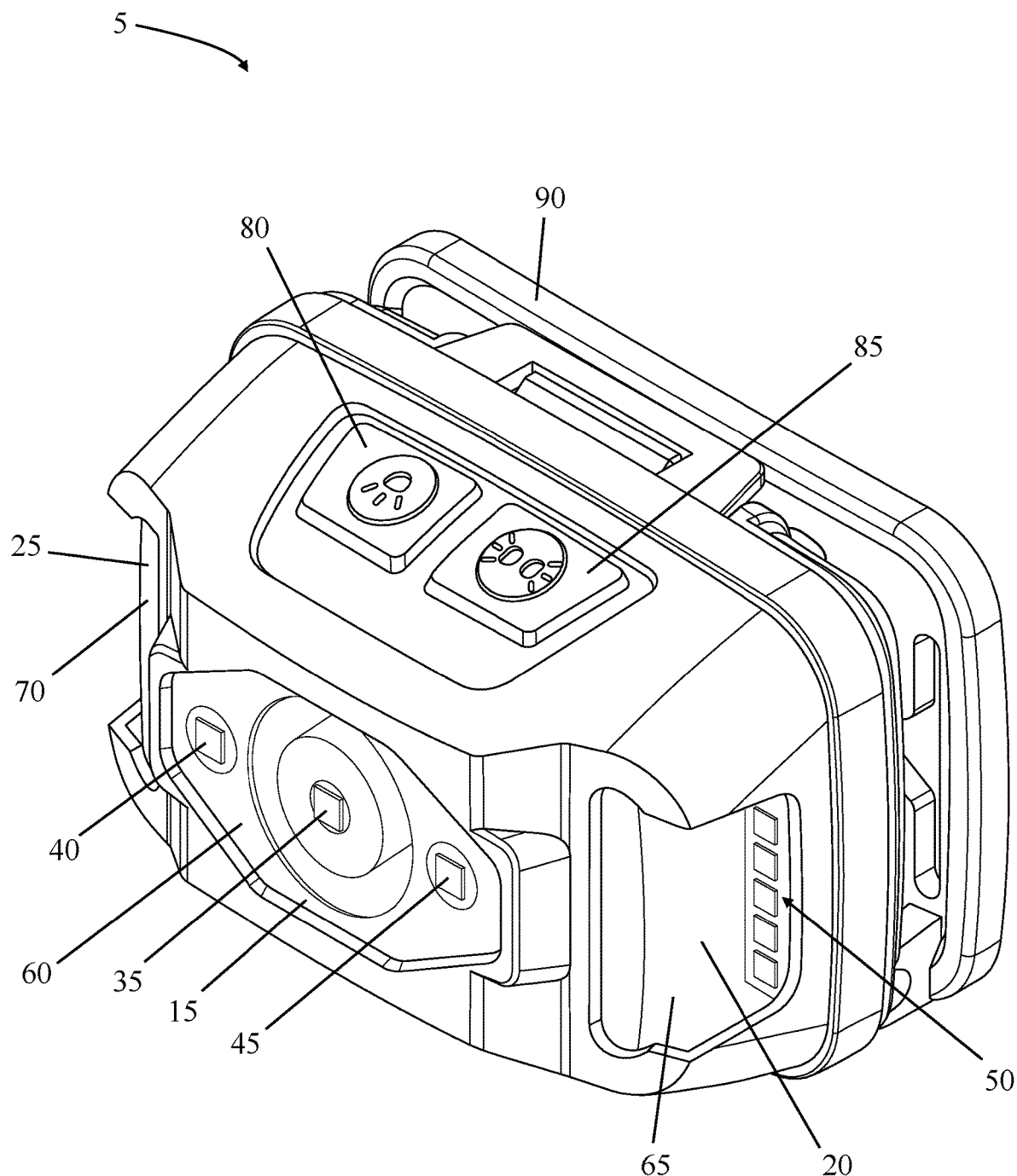
FIG. 2 shows a rear-bottom perspective view of the broad view headlamp, according to an embodiment of the present invention.
Figure 3:
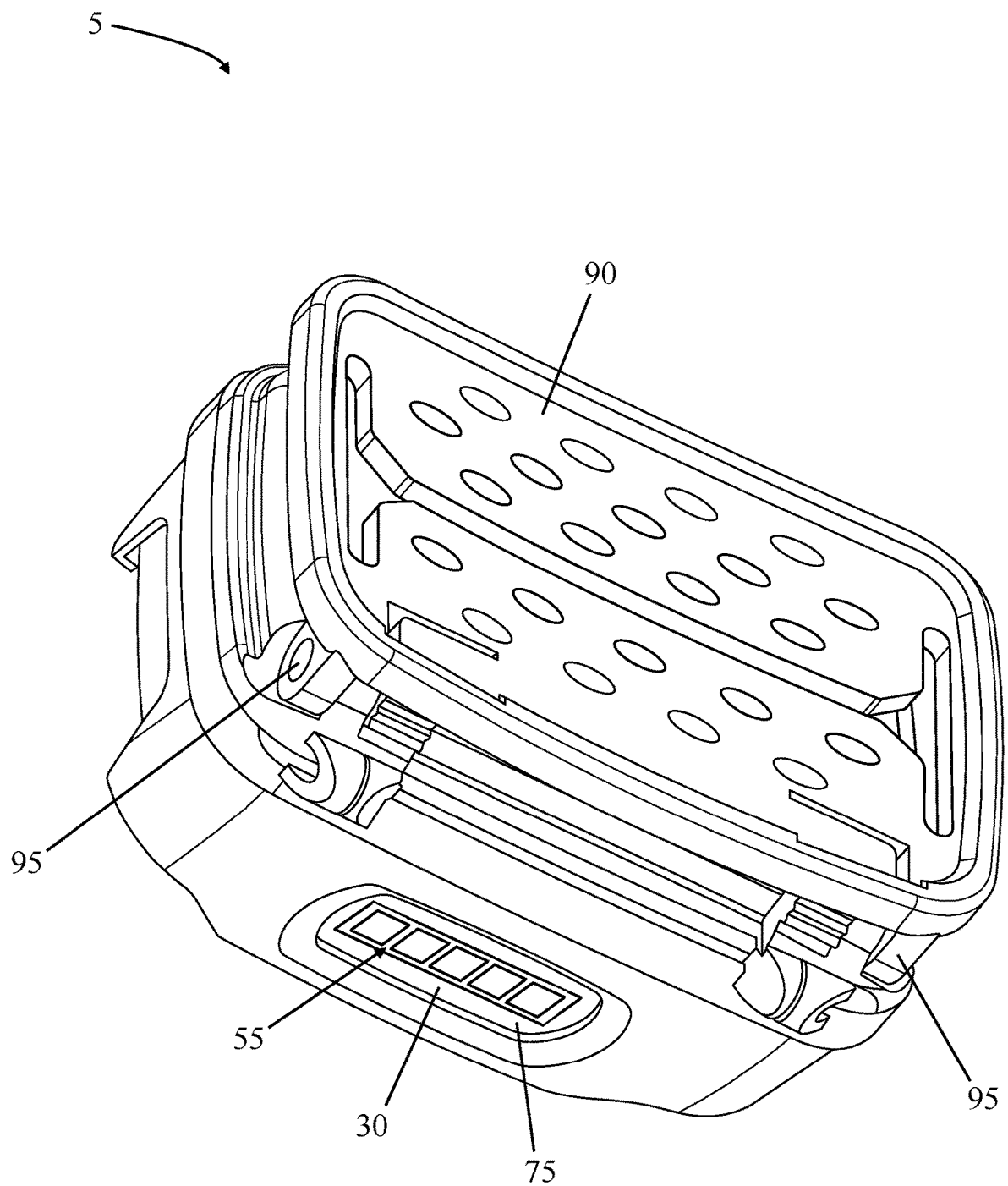
FIG. 3 shows a front elevational view of the broad view headlamp, according to an embodiment of the present invention.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, left/right, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Preferred embodiments of the present invention and their advantages may be understood by referring to FIGS. 1-5, wherein like reference numerals refer to like elements.

With reference to FIGS. 1-5, headlamp 5 includes housing 10 having multiple lighting compartments 15, 20, 25, 30, each housing one or more light source 35, 40, 45, 50, 52, 55. Light sources 35, 40, 45, 50, 52, 55 are preferably comprised of one or more LEDs. In an embodiment, one or more of the lighting compartments 15, 20, 25, 30 contain, in addition to the LED(s), one or more reflectors to gather and direct light generated by the LED(s) to an area adjacent to, e.g., in front of, beside, behind, and/or below, headlamp 5. Additionally, each lighting compartment 15, 20, 25, 30 includes an optical lens 60, 65, 70, 75 configured to increase a degree of horizontal and vertical lighting and beam distance of light output by light sources 35, 40, 45, 50, 52, 55. The array of light sources 35, 40, 45, 50, 52, 55, together with the reflectors and optical lenses 60, 65, 70, 75, allows headlamp 5 to illuminate a view area extending to, at least, the outer boundaries of the far peripheral vision of the human eye, i.e., 110 degrees to the right and left of center. Thus, as opposed to traditional headlamps that typically illuminate a view area of approximately 30 degrees, the total view area illuminated by headlamp 5 is at least 220 degrees.

Housing 10 is designed to prevent infiltration of liquid into the interior of housing 10, including, but not limited to, the battery compartment (not shown) and lighting compartments 15, 20, 25, 30. Depending on the desired application, housing 10 may be designed with a certain degree of water-resistance, such that it can be exposed to water according to specified conditions, e.g., splashing, spraying, etc., without risk of water entering housing 10. Alternatively, housing 10 may be designed to be completely waterproof, such that housing 10 can be fully submerged in water to pre-defined depths without risk of water entering housing 10.

Light sources 35, 40, 45, 50, 52, 55 can be activated individually or in combination with one or more of the other light sources 35, 40, 45, 50, 52, 55, depending on the desired lighting effect. For example, light source 35 can be activated to provide focused beam, i.e., spot beam, lighting in front of headlamp 5; light source 40 can be activated to provide broad-beamed, i.e., flood beam, lighting in front of headlamp 5; light source 45 can be activated to provide night vision lighting, e.g., red or blue-green light, in front of headlamp 5; light sources 50, 52 can be activated to provide wide-angle, i.e., far peripheral, lighting to the sides/rear of headlamp 5; or light source 55 can be activated to provide downwardly-disposed lighting below headlamp 5. Additionally, light sources 35, 40, 45, 50, 52, 55 can be activated in any combination to provide unique lighting options, based on the user's specific environmental needs. For example, with headlamp 5 positioned at the front of the user's head, if the user only wants to illuminate areas in his/her periphery and at the ground surface, he/she can activate only light sources 50, 52, 55. As another example, if the user only wants to illuminate the area forward of the user and at the ground surface, he/she can activate one or both of light sources 35/40 in combination with light source 55. As yet another example, if the user only wants to illuminate the area forward of himself/herself and areas in his/her periphery, he/she can activate one or both of light sources 35/40 in combination with light sources 50, 52. These examples are for illustrative purposes only, and should not be construed as limiting the lighting capabilities of the present invention to any particular lighting combinations.

Multifunctional switches 80, 85 are used to power-on/off and operate headlamp 5. In a preferred embodiment, as shown in the figures, switches 80, 85 are push-button switches. Switches for operating electronic devices are known to those skilled in the art and can be embodied in a number of ways other than that as illustrated. As such, other types of switches (other than those shown) could be employed with the present invention without deviating from the scope of the invention.

Once powered on, switches 80, 85 may be used for various functions, including, for example, switching between lighting modes, locking/unlocking operation/functionality of switches 80, 85, dimming light sources 35, 40, 45, 50, 52, 55, and setting a power-off timer (e.g., 15 minutes, 30 minutes, 1 hour, 2 hours, etc.) for powering off headlamp 5. In an embodiment, the functions of switches 80, 85 are executed based on a pre-determined action sequence, e.g., a 3-second press/touch-and-hold of one or both of switches 80, 85, a single press/tap and release, or a fast double press/tap and release or hold of one of switches 80, 85. For example, switches 80, 85 may be configured to power-on/off headlamp, based on a 3-second press/touch-and-hold of one or both of switches 80, 85. Once powered on, a single press/touch and release of switch 80 may be configured to toggle or switch between lighting modes; whereas, a single press/touch and release of switch 85 may be configured to set a power-off timer. Likewise, a fast double press/tap and hold of switch 80 may be configured to lock/unlock operation of switches 80, 85; whereas, a fast double press/tap and hold of switch 85 may be configured to dim the currently-activated light sources 35, 40, 45, 50, 52, 55 (or return lights to full brightness if currently in a dimmed setting). The foregoing examples are provided for illustrative purposes only, and are not meant to limit the scope of the present invention in any way. Switches 80, 85 can be pre-configured in any way to accomplish the desired functions. Likewise, additional switches (not shown) may be added to execute the various functions of headlamp 5.

Light sources 35, 40, 45, 50, 52, 55 and switches 80, 85 are in electrical communication with a lighting control module (not shown) within headlamp 5. The lighting control module is configured to receive, interpret, and execute user commands input by way of switches 80, 85. Circuitry and other mechanisms for operating a device using switches are known to those skilled in the art and can be carried out in a number of ways. Any such circuitry or mechanism can be used with the present invention without deviating from the scope a the invention.

The lighting control module is in electrical communication with a battery (not shown). In some embodiments, headlamp 5 may be configured to receive power from only one battery type, e.g., single-use (i.e., dry cell) batteries or rechargeable batteries (e.g., lithium-ion batteries). Alternatively, headlamp 5 may be configured as a dual power, or hybrid power, device, whereby it is configured to receive power from multiple battery types, e.g., single-use (i.e., dry cell) batteries or rechargeable batteries (e.g., lithium-ion batteries). For embodiments that employ rechargeable batteries, a charging dock or other charging apparatus/technology (not shown) may be used for recharging the batteries. Charging may be accomplished via any known technology known in the art, including, but not limited to, wired charging and/or inductive charging.

A heatsink assembly (not shown) may be required to keep the operating temperature of light sources 35, 40, 45, 50, 52, 55 at an acceptable operating temperature. Further disclosure of LED heatsinks is not considered necessary as they are known to those of skill in the art. Any known heat sinking method and/or configuration may be used with the present invention.

Panel 90 is coupled to the rear of headlamp 5 by hinges 95, allowing panel 90 to transition between an open and closed position. In the closed position, the edge of panel 90 opposite hinges 95 releasably engages the rear of headlamp using, for example, a releasable fastener as shown in the figure to secure panel 90 in the closed position. When released, panel 90 pivots open to, among other things, provide access to the battery compartment (not shown) and/or facilitate coupling or decoupling of headband 100 to/from headlamp 5, as shown in FIGS. 4-5.

Figure 4:
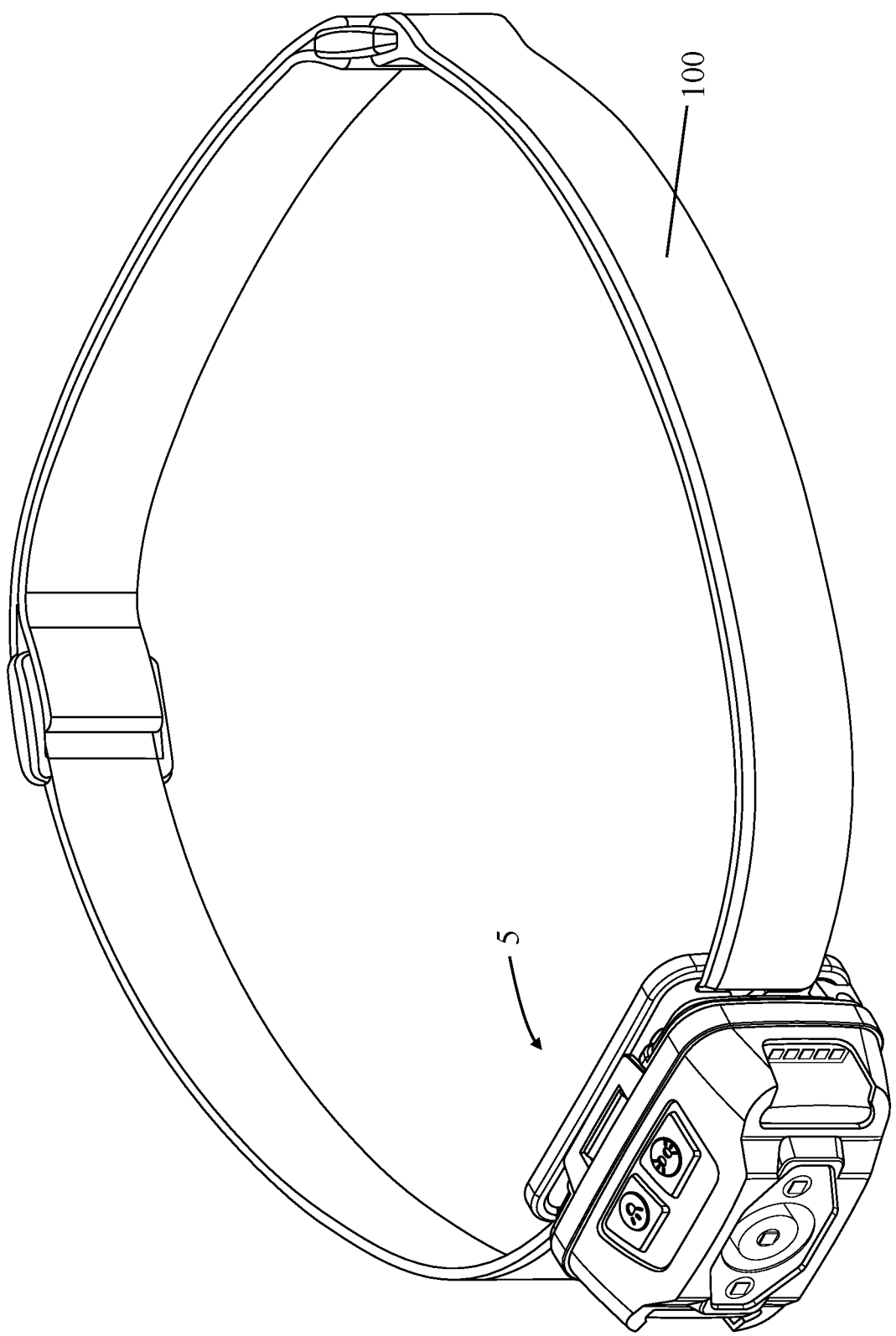
FIG. 4 shows a top-front perspective view of the broad view headlamp with a head strap attached, according to an embodiment of the present invention.
Figure 5:
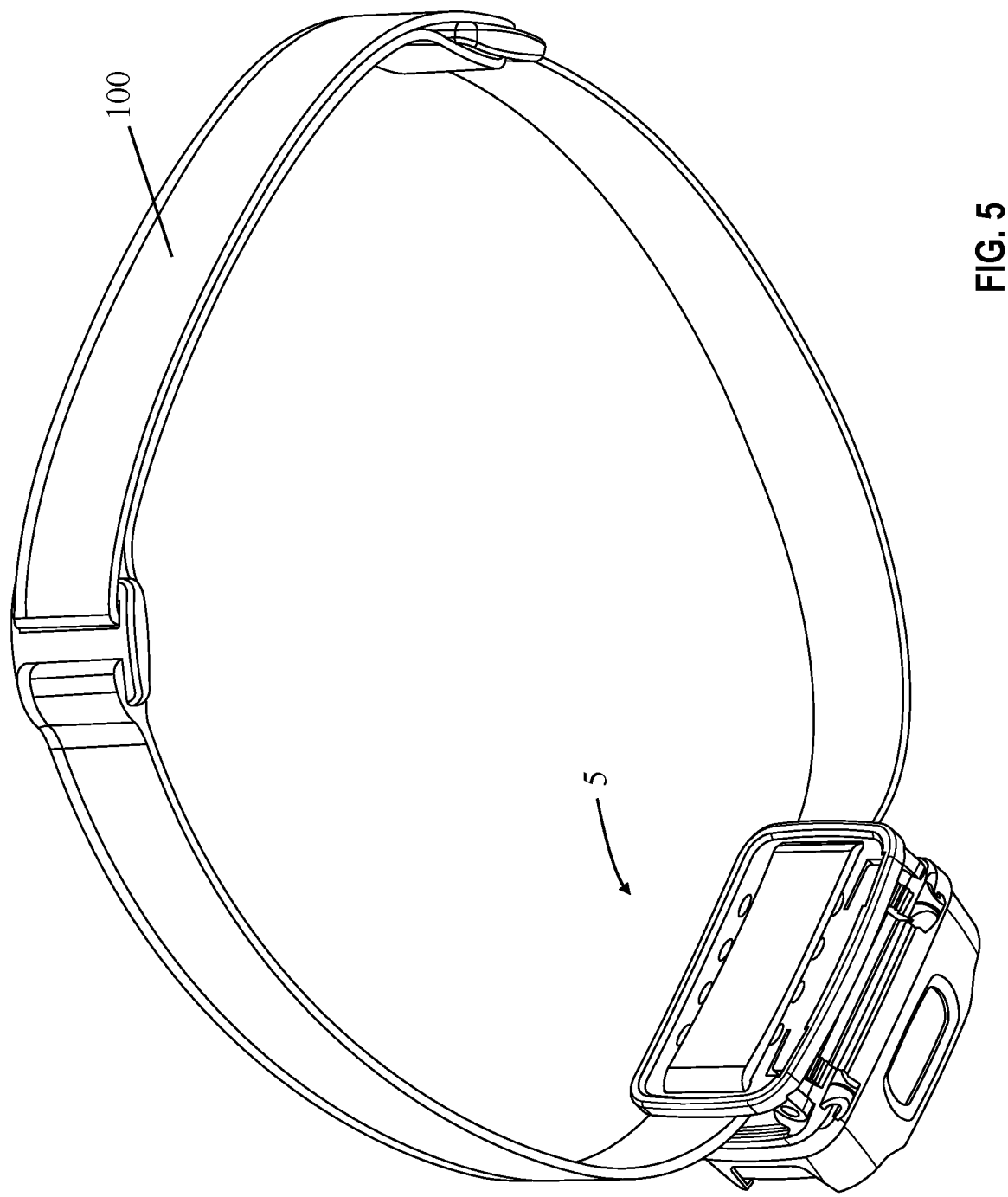
FIG. 5 shows a rear-bottom perspective view of the broad view headlamp with a head strap attached, according to an embodiment of the present invention.

In a preferred embodiment, as shown in FIGS. 4-5, headlamp 5 includes headband 100 for securing headlamp 5 to the user's head. Headband 100 is adjustable and is configured to encircle the head of a user (not shown), thereby supporting headlamp 5 on the user's head. The size of headband 100 may be secured at a desired diameter to fit the head of the user by a locking mechanism. A variety of securing mechanisms that will secure headband 100 at a desired size are well known to those of skill in the art. Therefore, the invention is not limited to any particular securing mechanism. In an embodiment, headband 100 has an adjustable, over-the-head support band (not shown). Just as with the securing mechanism for headband 100; securing mechanisms used to hold the over-the-head support are well known to those of skill in the art. Therefore, the invention is not limited to any particular securing mechanism. In lieu of using headband 100, headlamp may be secured to an object (not shown), e.g., eyewear (glasses, goggles, etc.), hats, etc. using a variety of securing mechanisms known to those of skill in the art. Therefore, headlamp 5 should not be construed as being limited to use with headband 100.

In various embodiments, headlamp 5 includes one or more sensors (not shown). Example sensors include, but are not limited to, an ambient light sensor, an inertial sensor (e.g., an accelerometer and/or a gyroscopic sensor), a motion sensor (e.g., a PAIR sensor, a microwave sensor, etc.), a heat sensor, a voltage detection sensor, a distance sensor, or any other sensor that can be used to detect changes in conditions of or external to headlamp 5. The sensors are in electrical communication with the control module, which is configured to receive real-time data from the sensor(s) and intuitively initiate/adjust lighting conditions/operations of headlamp 5 in real-time. For example, based on data received from the sensor(s), the control module may be configured to adjust the intensity/output of one or more light sources 35, 40, 45, 50, 52, 55, initiate or adjust lighting modes, initiate a low-power standby mode, "wake" headlamp 5 from the standby/sleep mode, etc.

In various embodiments, the control module is configured to initiate and/or adjust lighting settings of headlamp 5, based on data received from the sensors and pre-programmed logic stored in memory of the control module. For example, in an embodiment, the control module is configured to compare the data received from the sensor(s) to one or more threshold values stored in the memory, wherein the control module is configured to adjust the lighting device output modes and intensity of one or more light sources 35, 40, 45, 50, 52, 55 only when the threshold value(s) are met or exceeded. Additionally, the sensor(s) may be pre-programmed with one or more threshold values for detecting motion, wherein the sensor(s) are configured to transmit data to the control module only when the threshold value(s) are met or exceeded.

An ambient light sensor may be used to detect and measure light intensity external to the multipurpose lighting device. In an embodiment, the control module includes program logic configured to select and adjust lighting output modes and initiate and adjust an intensity of one or more light sources 35, 40, 45, 50, 52, 55 using pulse width modulation brightness controls responsive to the ambient light sensor data.

An inertial sensor and/or a motion sensor may be used to detect motion of or external to headlamp 5. In an embodiment, if motion of or external to headlamp 5 is not detected for a pre-configured amount of time, the control module is configured to initiate a standby mode. Upon initiation of the standby mode, the control module may be configured to save current state settings and disable all peripherals except one or more sensors, e.g., the inertial sensor, the motion sensor, and/or the ambient light sensor. If, during the standby mode, motion is detected for a pre-configured amount of time, the control module is configured to initiate an operating mode. In an embodiment, the operating mode is a lighting mode in use immediately preceding initiation of the standby mode. In an embodiment, the control module is configured to disrupt the standby mode if the control module detects a low battery condition during the standby mode. In a further embodiment, if the standby mode is disrupted due to detection of the low battery condition, the control module is configured to initiate a dim lock mode upon disruption of the standby mode.

In an embodiment, the control module is able to modify lighting output (e.g., initiate a lighting mode, change lighting mode, alter lighting intensity, etc.) in real-time in response to sensor data indicating user gestures (e.g., a hand wave, a bump, etc.) and/or conditions external to headlamp 5 (e.g., changes in ambient light levels, etc.). In an embodiment, the control module includes logic pre-programmed to identify the occurrence of gestures or changes in conditions external to headlamp 5, based on analysis of data received from the sensor(s).

A voltage detection sensor may be used to monitor real-time voltage levels of the battery(ies). The control module is configured to compare real-time battery voltage information received from the voltage detection sensor to battery threshold values stored in memory to determine if a current mode of operation needs to be adjusted. In an embodiment, the control module is configured to automatically adjust power consumption of headlamp 5, based on remaining battery life measured by the control module. In an embodiment, the control module is configured to initiate a dim mode if a low battery condition is detected. If a low battery condition is detected, the control module is configured to activate a visual and/or audio indicator, e.g., a low battery light and/or audible beep, to indicate the low battery condition to the user.

A distance/proximity sensor may be used to detect nearby objects and determine distance to target. Based on the distance to target determined by the sensor, the control module is configured to increase or decrease light intensity. For example, if the light(s) is/are directed to a close-proximity manual being read by the user, the control module would reduce the light intensity and increase spread, based on proximity information from the sensor. Alternatively, if the light(s) is/are directed at a distant target, the control module would increase the light intensity and reduce spread, based on proximity information from the sensor, to concentrate the light on the distant target. The distance sensor may perform measurements to targets using any measurement detection means (e.g., lasers, sound waves, etc.) known in the art.

The invention has been described herein using specific embodiments for the purposes of illustration only. It will be readily apparent to one of ordinary skill in the art, however, that the principles of the invention can be embodied in other ways. Likewise, it will be readily apparent that the features, functions, and/or elements of the present invention disclosed herein can be used in any combination to produce various embodiments of the present invention. Therefore, the invention should not be regarded as being limited in scope to the specific embodiments disclosed herein, but instead as being fully commensurate in scope with the following claims.

I claim:

1. A headlamp comprising:
   a first light source disposed at a front of the headlamp;
   a second light source disposed at a first side of the headlamp;
   a third light source disposed at a second side of the headlamp;
   a fourth light source disposed at a bottom of the headlamp;
   a power source in electrical communication with the first light source, the second light source, the third light source, and the fourth light source;
   a lighting control module configured to activate each of the first light source, the second light source, the third light source, and the fourth light source; and
   where the lighting control module includes at least a periphery-only illumination mode that activates only the second light source, the third light source, and the fourth light source.

2. The headlamp of claim 1, wherein the first light source is configured to illuminate a first area in front of the headlamp, wherein the second light source is configured to illuminate a second area to a first peripheral side of the headlamp, wherein the third light source is configured to illuminate a third area to a second peripheral side of the headlamp, wherein the fourth light source is configured to illuminate a fourth area below the headlamp.

3. The headlamp of claim 2, wherein a combined view area illuminated by the first light source, the second light source, and the third light source is at least 220 degrees.

4. The headlamp of claim 1, wherein the first light source comprises:
   a spot light; and
   one or more flood lights.

5. The headlamp of claim 4, wherein the one or more flood lights are disposed adjacent to the spot light.

6. The headlamp of claim 4, wherein the first light source further comprises one or more night vision lights.

7. The headlamp of claim 1, wherein any one of the first light source, the second light source, the third light source, and the fourth light source can be activated and operated individually or in combination with any one or more of the first light source, the second light source, the third light source, and the fourth light source.

8. The headlamp of claim 1, wherein the first light source, the second light source, the third light source, and the fourth light source are dimmable.

9. The headlamp of claim 1, wherein each of the first light source, the second light source, the third light source, and the fourth light source, are housed within separate compartments of a housing of the headlamp, wherein each compartment is separated from an area exterior to the housing by one or more lenses.

10. The headlamp of claim 9, wherein the one or more lenses are configured to increase a degree of horizontal and vertical lighting and beam distance output by the first light source, the second light source, the third light source, and the fourth light source.

11. The headlamp of claim 1, wherein a light output of the first light source, the second light source, the third light source, and the fourth light source ranges from 100 lumens to 650 lumens.

12. The headlamp of claim 1, wherein each of the first light source, the second light source, the third light source, and the fourth light source comprise at least one Light Emitting Diode (LED).

13. The headlamp of claim 1, wherein the power source comprises a dry cell battery.

14. The headlamp of claim 1, wherein the power source comprises a rechargeable battery.

15. The headlamp of claim 1, further comprising:
a voltage sensor that is configured to monitor a real-time voltage of the power source;
an inertial sensor that is configured to monitor a motion of the headlamp; and
a lighting control module configured to initiate a dim mode for at least one of the first light source and the fourth light source based on at least one of the real-time voltage and the motion.

16. A headlamp comprising:
a first light source configured to illuminate a first area in front of the headlamp;
a second light source configured to illuminate a second area below the headlamp;
a power source in electrical communication with the first light source and the second light source;
a voltage sensor that is configured to monitor a real-time voltage of the power source;
an inertial sensor that is configured to monitor a motion of the headlamp; and
a lighting control module configured to initiate a dim mode for at least one of the first light source and the second light source based on at least one of the real-time voltage and the motion.

17. The headlamp of claim 16, wherein the first light source and the second light source are housed within separate compartments of a housing of the headlamp, wherein each compartment is separated from an area exterior to the housing by one or more lenses.

18. The headlamp of claim 16, further comprising a third light source configured to illuminate a third area to a first peripheral side of the headlamp and a fourth light source configured to illuminate a fourth area to a second peripheral side of the headlamp.

19. The headlamp of claim 18, wherein any one of the first light source, the second light source, the third light source, and the fourth light source can be activated and operated individually or in combination with any one or more of the first light source, the second light source, the third light source, and the fourth light source.

20. The headlamp of claim 16, wherein the first light source comprises a spot light and one or more flood lights.

21. A headlamp comprising:
a housing;
a first light source that is housed within a first compartment comprising a first lens, where the first light source is configured to illuminate a first area in front of the headlamp;
a second light source that is housed within a second compartment comprising a second lens, where the second light source is configured to illuminate a second area to a first side of the headlamp;
a third light source that is housed within a third compartment comprising a third lens, where the third light source is configured to illuminate a third area to a second side of the headlamp;
where a combined illumination area of the first light source, the second light source and the third light source encompasses an entire range of peripheral vision for a wearer; and
a power source in electrical communication with the first light source, the second light source, the third light source.

22. The headlamp of claim 21, further comprising a fourth light source configured to illuminate a fourth area below the headlamp.

23. The headlamp of claim 22, further comprising:
a voltage sensor that is configured to monitor a real-time voltage of the power source;
an inertial sensor that is configured to monitor a motion of the headlamp; and
a lighting control module configured to initiate a dim mode for at least one of the first light source and the fourth light source based on at least one of the real-time voltage and the motion.

24. The headlamp of claim 22, wherein any one of the first light source, the second light source, the third light source, and the fourth light source can be activated and operated individually or in combination with any one or more of the first light source, the second light source, the third light source, and the fourth light source.

25. The headlamp of claim 24, wherein the first light source, the second light source, the third light source, and the fourth light source are dimmable.

26. The headlamp of claim 21, wherein the first light source comprises a spot light and one or more flood lights.

* * * * *